United States Patent [19]

Matzner et al.

[11] Patent Number: 4,975,470

[45] Date of Patent: Dec. 4, 1990

[54] BLENDS COMPRISING POLY(ARYL ETHER KETONE CO-CARBONATES)

[75] Inventors: Markus Matzner, Edison; Barry D. Dean, Belle Mead; Donald M. Papuga, N. Plainfield, all of N.J.

[73] Assignee: Amoco Corporation, Chicago, Ill.

[21] Appl. No.: 362,051

[22] Filed: Jun. 6, 1989

[51] Int. Cl.$^5$ .................. C08C 81/02; C08L 79/08; C08L 71/12; C08L 69/00
[52] U.S. Cl. ............................ 521/134; 524/425; 524/441; 524/445; 524/449; 524/451; 524/456; 524/537; 525/433; 525/462; 525/471; 525/537
[58] Field of Search ............... 525/433, 462, 394, 471, 525/537; 521/134

[56] References Cited

U.S. PATENT DOCUMENTS

| | | | |
|---|---|---|---|
| 4,684,699 | 8/1987 | Robeson | 525/471 |
| 4,804,724 | 2/1989 | Harris et al. | 525/471 |
| 4,837,284 | 6/1989 | Matzner et al. | 525/437 |
| 4,880,884 | 11/1989 | Mullins | 525/462 |

*Primary Examiner*—Melvyn I. Marquis
*Assistant Examiner*—David Buttner
*Attorney, Agent, or Firm*—William H. Magidson; Ralph C. Medhurst

[57] ABSTRACT

Blends comprising from about 1 to about 99 percent by weight of a poly(aryl ether ketone co-carbonate) and from about 99 to about 1 percent by weight of a thermoplastic polymer selected from the group of a poly(aryl ether ketone), a poly(arylene sulfide), a poly(ether imide) or a poly(aryl ether).

15 Claims, No Drawings

BLENDS COMPRISING POLY(ARYL ETHER KETONE CO-CARBONATES)

FIELD OF THE INVENTION

This invention is directed towards novel blends of poly(aryl ether ketone co-carbonates) with poly(aryl ether ketones), poly(arylene sulfides), poly(ether imides), and poly(aryl ethers). The materials comprising poly(aryl ether ketones) and poly(arylene sulfides) display improved toughness and fabrication characteristics. The poly(ether imide) and poly(aryl ether) comprising alloys are resins with a unique combination of toughness, high temperature properties and environmental stress-rupture resistance.

A new process allowing for the preparation of high quality foams from the above polymers and polymer alloys is also described.

BACKGROUND OF THE INVENTION

Poly(aryl ether ketones) are a relatively new class of engineering polymers. These polymers are crystalline and exhibit an excellent combination of properties, i.e. excellent thermal and hydrolytic stability, high strength and toughness, excellent wear and abrasion resistance and excellent solvent resistance. Thus, articles molded from poly(aryl ether ketones) have utility where high performance is required. Representative materials of this class are the polymers (1) and (2).

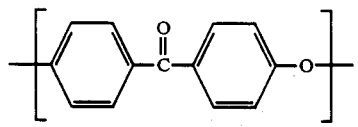

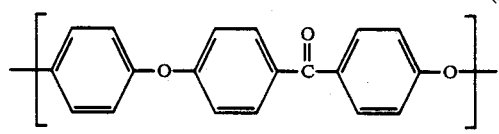

To achieve the desired combination of properties, high molecular weight poly(aryl ether ketones) are necessary. These high molecular weight poly(aryl ether ketones) have a narrow processing latitude and require very high processing temperatures (about 400° C.) during molding. Many materials which could act as plasticizer or processing aid for the poly(aryl ether ketones) are not stable at such a high processing temperature. Also, most polymers do not have adequate thermal stability at such processing temperatures to allow them to be blended with the poly(aryl ether ketone).

Thus, there is a desire to improve the processing of poly(aryl ether ketones), particularly in the presence of fibers and fillers which decrease the processing range.

Poly(arylene sulfides), e.g. polyphenylene sulfides (hereinafter abbreviated "PPS") are high performance, crystalline engineering plastics; the materials of the PPS class have excellent heat resistance, good hydrolytic and chemical resistance, and high rigidity. These products compare favorably with other engineering polymers such as the nylons, the polycarbonates, polyacetals and poly(butylene terephthalate). Moreover, these polymers are relatively inexpensive and have very good abrasion resistance. PPS resins, however, have a serious drawback: they have poor toughness. Even the recently prepared versions of PPS that are linear, also show poor impact strength and elongation in the crystalline state. Thus, the need exists to improve the overall mechanical properties of PPS.

Poly(ether imides) are also commercially available. They are amorphous thermoplastic polymers with high heat resistance, high strength and modulus, and high dielectric strength. Polyetherimides can be molded into a variety of articles. However, the ultimate use temperature and solvent resistance of the polyetherimides is not acceptable in end-use applications where such properties are required. Hence, improvement of these deficiencies without essentially affecting other properties of the poly(ether imides) is highly desirable.

Poly(aryl ether) resins are tough rigid high strength thermoplastics which maintain their properties over a wide temperature range of from −15° F. to above 300° F. They have a high continuous use temperature of about 300° F. They are hydrolytically stable and have excellent mechanical and electrical properties which allows them to be molded into a variety of articles.

The poly(aryl ethers) (hereinafter referred to as PAE's) presenting the greatest practical interest are those that contain the sulfone group. Thus, poly(aryl ether sulfones) (3) and (4)

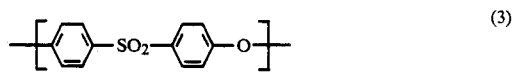

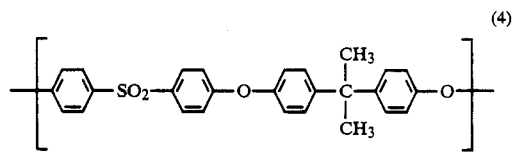

are commercially available tough thermoplastic materials. They possess a number of attractive features such as excellent high temperature resistance, good electrical properties, and very good hydrolytic stability. Polymer (3) is available from Imperial Chemical Industries, Ltd. under the trademark of Victrex ® Poly(ether sulfone). It is produced by the polycondensation of 4,4,-dihydroxydiphenyl sulfone with 4,4,-dichlorodiphenyl sulfone as described in, for example, Canadian Patent No. 847,963. The resin contains no aliphatic moeities and has a heat deflection temperature of approximately 210° C. Material (4) is available from Amoco Performance Products, Inc., under the trademark of UDEL ®. It has a heat deflection temperature of about 180° C., and is made via the nucleophilic polycondensation of bisphenol-A di-sodium salt with 4,4 -dichlorodiphenyl sulfone, as described in U.S. Pat. No. 4,108,837.

Poly(aryl ether) resins are highly resistant to mineral acids, and salt solutions but when exposed to polar organic solvents, they readily stress crack.

Obviously, if it were possible to improve the environmental and stress-crack resistance of the PAE's, a truly remarkable class of products would be at hand.

THE INVENTION

It was unexpectedly discovered that blends comprising poly(aryl ether ketones) containing at least 5 mole percent of carbonate linkages, and poly(aryl ether ketones), or poly(arylene sulfides), or poly(ether imides), or poly(aryl ethers) display a combination of unique and totally unexpected properties.

The poly(aryl ether ketone co-carbonates) ("PAEK co-carbonates"), as hereinbelow described, are tough, high melting polymers having good stress-crack and solvent resistance. Blends of the latter with poly(aryl ether ketones) (PAEK's) were surprisingly found to have excellent high temperature stability and improved melt-fabricability, in spite of the presence of the relatively labile carbonate linkages.

Alloys with PPS and other poly(arylene sulfides) were found to possess better toughness than the parent polysulfides without, astonishingly, affecting their melt-fabricability.

Good compatibility—an unexpected feature with polymeric materials—was found also for the poly(ether imide)-PAEK co-carbonate alloys. The products retain the strength of the parent poly(ether imides) and display improved high temperature and solvent resistance.

Better stress-crack and solvent resistance properties are also encountered when the PAEK-co-carbonates are alloyed with poly(aryl ethers), in particular with poly(aryl ether sulfones).

Note, that PPS-PAEK and PAE-PAEK blends have been described. See U.S. Pat. Nos. 4,684,699; 4,624,997; and 4,713,426. Mixtures of PAEK's with poly(ether imides) are the subject of commonly assigned U.S. patent application, Ser. No. 008,696, filed in the names of J. E. Harris, L. M. Robeson and J. P. Gavula on Jan. 30, 1987.

Our own investigations indicate that the use of PAEK co-carbonates instead of PAEK's in the subject alloys gives unexpectedly better results. It is speculated that the presence of the carbonate linkages in the poly(aryl ether ketone) causes better chain flexibility and better overall performance. This is applicant's theory and applicant does not wish to be bound thereby.

The alloys of the instant invention comprise from about 1 to about 99, preferably from about 20 to about 80, percent by weight of the poly(aryl ether ketone co-carbonate) and, conversely, from about 99 to about 1, preferably from about 80 to about 20, percent by weight of the other polymer.

The PAEK co-carbonates useful in the instant invention as well as the process for their preparation have been described in commonly assigned U.S. patent application, Ser. No. 136,269, filed in the names of M. Matzner and B. D. Dean on Dec. 22, 1987.

These copolymers contain the following units:

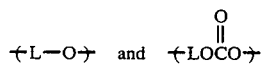

wherein (LO) is one or more of the structures [A] to [P] hereinafter defined; and wherein the content in carbonate units is greater than about 5 mole percent and up to 50 mole percent; preferably greater than about 10 mole percent and up to 40 mole percent, based on the total ether and carbonate units.

The ⁺(L-O)⁺ units of the instant invention are comprised of ether oxygen and keto (carbonyl) groups interconnected by aromatic diradicals such as 1,4-phenylene. They may be characterized more specifically by one or more of the following formulae:

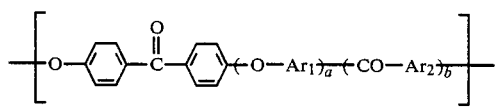

[A]

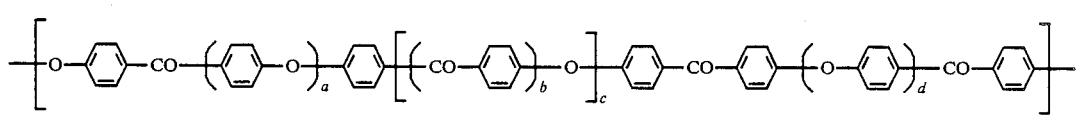

[B]

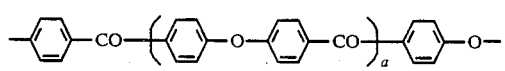

[C]

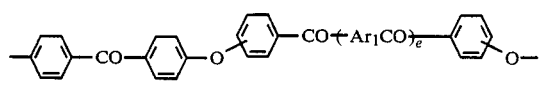

[D]

wherein $Ar_1$ and $Ar_2$ are independently divalent aromatic radicals selected from phenylene, biphenylene, or naphthylene, and a is an integer of from 1 to 4; b, c, d, and e are 0 to 1.

Preferred ⁺(L-O)⁺ units are those having the formulae

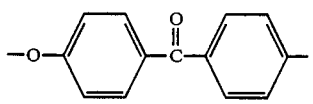

[E]

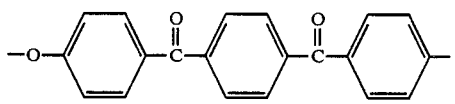

[F]

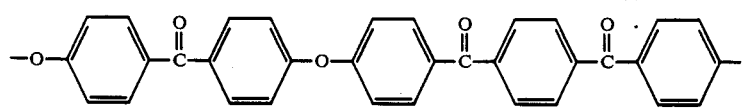 [G]

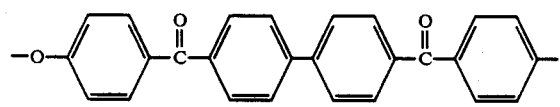 [H]

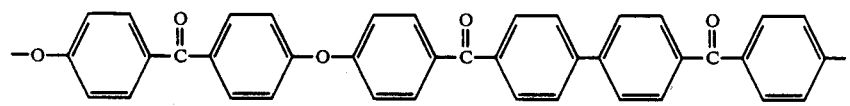 [I]

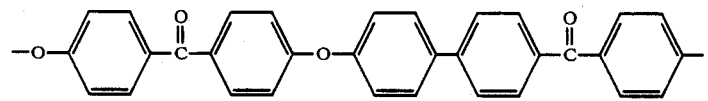 [J]

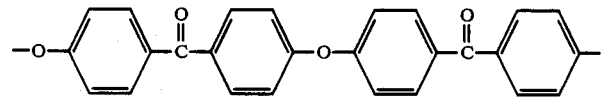 [K]

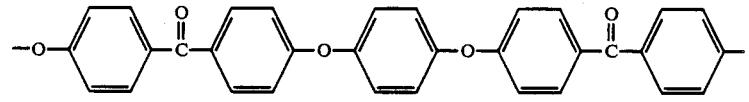 [L]

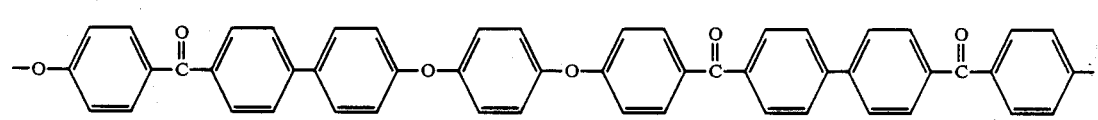 [M]

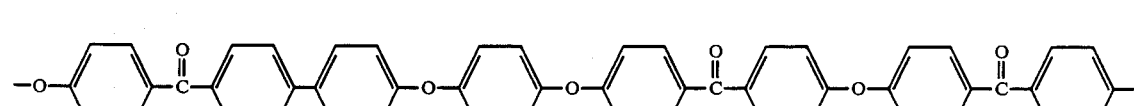 [N]

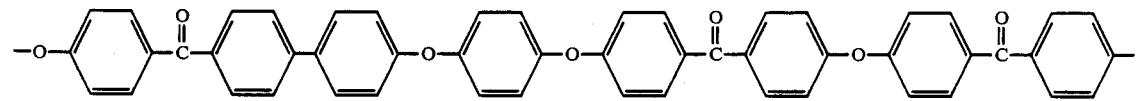 [O]

and

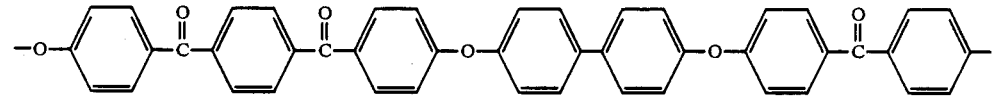 [P]

where a is as previously defined, f and g are integers and can be independently from 0 to 5; h is 1 to 4; and $Ar_3$ is selected from the group of

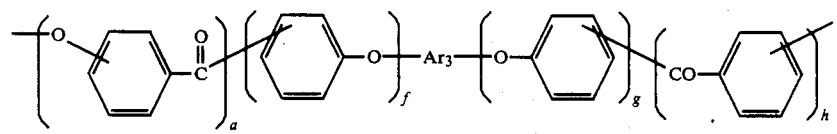

where X is O, S, $C_1$ to $C_{10}$ alkylene, $C_2$ to $C_{10}$ alkylidene, $C_6$ to $C_{12}$ cycloalkylene or cycloalkylidene, CO, $C_6$ to $C_{20}$ arylene, a $C_6$ to $C_{20}$ heterocyclic divalent residue, or a chemical bond;

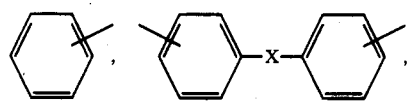

or isomers thereof

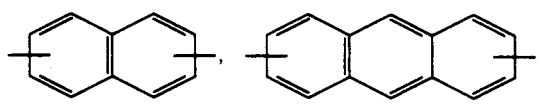

or isomers thereof and 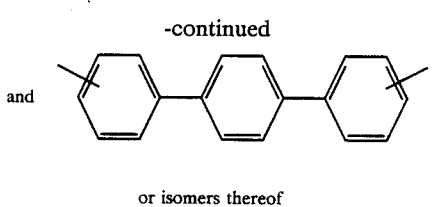

or isomers thereof

The poly(aryl ether ketone co-carbonates) can be prepared via the base-catalyzed reaction of one or more aromatic diphenols, wherein the hydroxyl groups are in positions ortho and/or para to carbonyl groups, with a diaryl carbonate. In another embodiment, the reaction can be performed using a bis-(arylcarbonate) ester of the aromatic diphenol; or a bis(arylcarbonate)-terminated polycarbonate of said aromatic diphenol. Decarboxylation of carbonate bonds with concomitant evolution of carbon dioxide takes place and ether bonds are formed.

A variety of diaryl carbonates can be used in the instant polymerizations. The only prerequisite is that the corresponding phenol, ArOH, be stable under the polymer forming conditions. Thus, in addition to phenyl, the group Ar may be o-, m- and p-tolyl, α-naphthyl, and the like. Phenyl groups are preferred.

The reactions are performed in the presence of from about 0.1 to about 5.0 weight percent, based on the total weight of reactants, of a base catalyst. Amounts in the range of from about 0.5 to about 3.0 weight percent are preferred. Suitable catalysts are alkali and alkaline earth metal hydrides, hydroxides, alkoxides, carbonates, bicarbonates, carboxylates (e.g., acetates or benzoates), and phenoxides. Alkali metal carbonates and phenoxides are preferred. Note, that typical transesterification catalysts, such as tetrabutyl titanate, are also useful.

The polymerizations take place at temperatures within the range of from about 250° C. to about 400° C. Preferred polymerization temperatures are from about 280° C. to about 350° C. Reaction times may vary from about 10 minutes, or even less in some cases, to as long as several hours. Although in some instances satisfactory results are obtained under atmospheric pressure, reduced pressures are preferred.

Good results are obtained both in bulk and in solvents. Bulk reactions may, for example, be conducted in a kneader or in an extruder equipped with vents for phenol removal.

Preferably, the solvent employed is an aliphatic or aromatic sulphoxide or sulphone of the formula $$R-S(O)_x-R'$$

where x is 1 or 2 and R and R' are alkyl or aryl group and may be the same or different. R and R' may together form a divalent radical. Preferred solvents include dimethyl sulphone, sulpholane (1,1-dioxothiolan), or aromatic sulphones of the formula

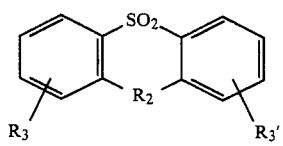

where $R_2$ is a direct link, an oxygen atom or two hydrogen atoms (one attached to each benzene ring) and $R_3$ and R', which may be the same or different, are hydrogen atoms or phenyl groups. Examples of such aromatic sulphones include diphenylsulphone, ditolyl sulphone, tolylphenyl sulphone, dibenzothiophene dioxide, phenoxathiin dioxide and 4-phenylsulphonyl biphenyl. Diphenylsulphone is the preferred aromatic sulfone solvent. Other very useful and preferred solvents that may be used, include N,N-dimethyl formamide, N-methyl-2-pyrolidone, N,N-dimethylacetamide, and N-cyclohexyl pyrolidone. In another embodiment, the reaction is started in a relatively low boiling polar aprotic solvent such as dimethyl formamide, dimethylacetamide, dimethyl sulfoxide, N-methylpyrolidone, and the like. Heating at reflux results in the formation of low molecular weight product with attendant precipitation. The solvent may be removed and the low molecular weight product may be advanced if desired, by solid-state polymerization, i.e., by heating to a temperature in the range of from about 250° to about 400° C.; preferably, an inert atmosphere is maintained during this latter step.

The ether-to-carbonate ratio of the subject copolymers was shown to be dependent on the experimental conditions (temperature, type and concentration of catalyst); and could also be influenced by using certain additives (e.g. KF).

The aromatic dihydroxy compounds useful for the purposes of the instant invention must have the two hydroxyl functions in positions ortho or para to the carbonyl groups. Both monomeric and oligomeric dihydroxy compounds may be employed. Typical representative dihydroxy compounds are listed:

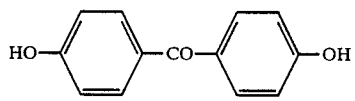

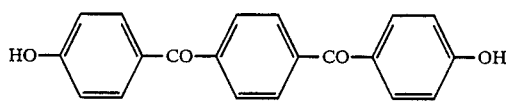

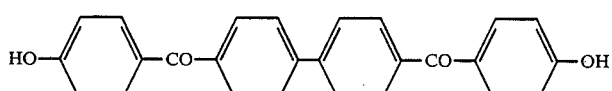

-continued

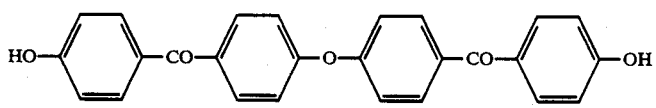

and

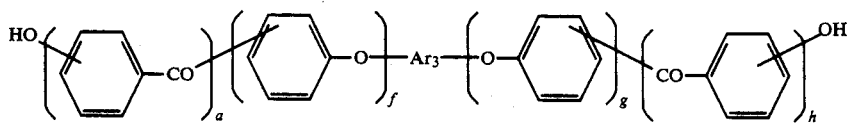

where a, f, g, h and Ar₃ are as previously defined.

Oligomeric dihydroxy-terminated poly(aryl ether ketones) have been described in U.S. Pat. No. 4,774,296. They can be prepared via nucleophilic or electrophilic processes.

Useful poly(aryl ether ketone co-carbonates) exhibit reduced viscosities of from about 0.6 to about 5.0, preferably from about 1.0 to about 2.0 dl/g as measured in an appropriate solvent (1 g/100 ml) at 25° C.

The Poly(aryl) ether ketones)

The crystalline poly(aryl ether ketone)s which are suitable for use herein can be generically characterized as containing a repeating unit of one or more of the following formulae:

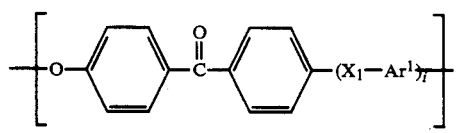 [I]

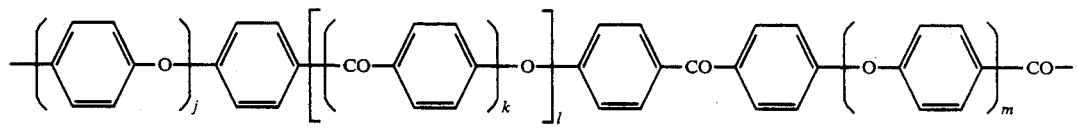 [II]

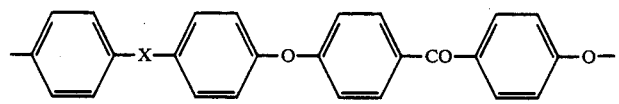 [III]

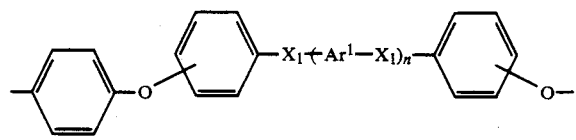 [IV]

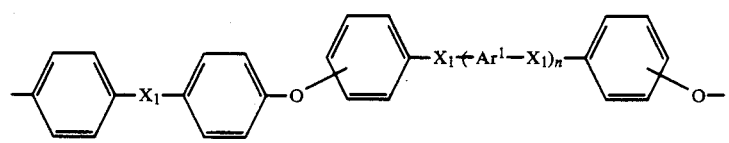 [V]

wherein $Ar^1$ is independently a divalent aromatic radical selected from phenylene, biphenylene or naphthylene, $X_1$ is independently O,

or a direct bond and i is an integer of from 0 to 3; k, l, m and n are 0 or 1 and j is an integer of 1 to 4 and preferably m is 0 when k is 1.

Preferred poly(aryl ketone)s include those having a repeating unit of the formula:

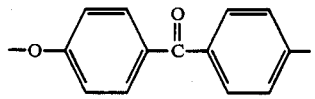

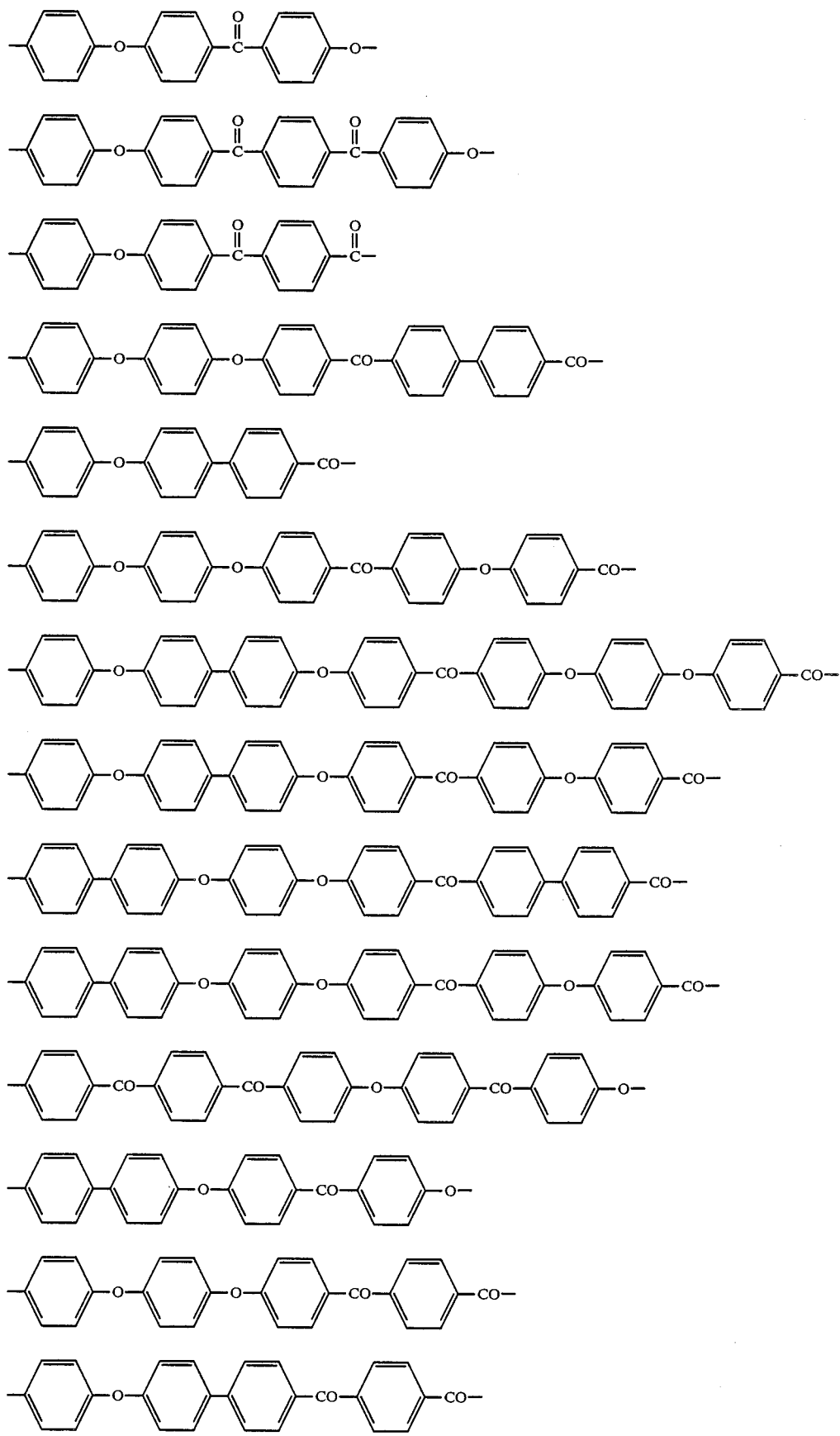

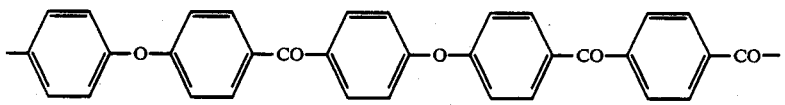

These poly(aryl ketone)s are prepared by methods well known in the art. One such method comprises heating a substantially equimolar mixture of at least one bisphenol and at least one dihalobenzenoid compound or at least one halophenol compound as described in Canadian Patent No. 847,963. Preferred bisphenols in such a process include:
hydroquinone,
4,4'-dihydroxybenzophenone,
4,4'-dihydroxybiphenyl, and
4,4'-dihydroxydiphenyl ether.

Preferred halo and dihalobenzenoid compounds include:
4-(4-chlorobenzoyl)phenol,
4,4'-difluorobenzophenone,
4,4'-dichlorobenzophenone,
4-chloro-4'-fluorobenzophenone,

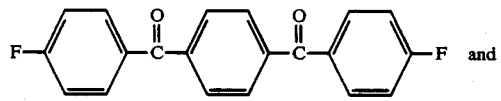

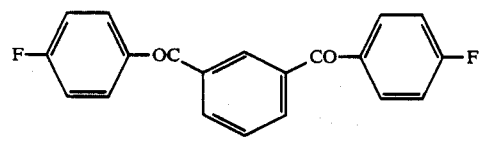

The poly(aryl ketone)s may be produced by the process as described in, for example, U.S. Pat. No. 4,176,222. This process comprises heating in the temperature range of 100° to 400° C., (i) a substantially equimolar mixture of (a) at least one bisphenol and (b) at least one dihalobenzenoid compound, and/or (ii) at least one halophenol, in which in the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.5 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Other base systems may be used to prepare the poly (aryl ether ketones). Thus, the above polycondensations can also be performed in the presence of (a). a combination of sodium carbonate and/or bicarbonate and an alkali metal halide selected from potassium, rubidium or cesium fluoride or chloride, or combinations thereof (see U.S. Pat. No. 4,638,044); (b). a combination of (1) lithium and/or an alkaline earth metal carbonate; and (2) sodium, potassium or cesium carbonate (see German Patent Application No. 3,342,433); (c). a combination of sodium or an alkaline earth metal carbonate or bicarbonate and a potassium, rubidium or cesium salt of an organic acid (see U.S. Pat. No. 4,748,227); and (d). a combination of sodium or an alkaline earth metal carbonate or bicarbonate and a lithium, sodium or an alkaline earth metal salt of an organic acid, optionally in combination with a catalytic amount of a potassium, cesium or rubidium salt catalyst (see U.S. Pat. No. 4,774,314).

Also, poly(aryl ketone)s such as those containing repeating units of the formula:

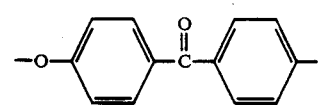

may be produced by Friedel-Crafts reactions utilizing hydrogen fluoride-boron trifluoride catalysts as described, for example, in U.S. Pat. No. 3,953,400.

Additionally, poly(aryl ketones) of the following formula:

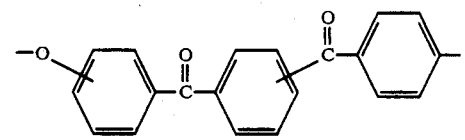

may be prepared by Friedel-Crafts reactions using a boron fluoride-hydrogen fluoride catalyst as described in, for example, U.S. Pat. Nos. 3,441,538; 3,442,857 and 3,516,966.

Additionally, the polymers may be prepared by the Friedel-Crafts processes as describe in, for example, U.S. Pat. Nos. 3,065,205; 3,419,462; 3,441,538; 3,442,857; 3,516,966 and 3,666,612. In these patents, a PAEK is produced by Friedel-Crafts polymerization techniques using Friedel-Crafts catalysts such as aluminum trichloride, zinc chloride, ferric bromide, antimony pentachloride, titanium tetrachloride, etc. and a solvent.

The polyketones may also be prepared according to the process as described in, for example, U.S. Defensive Publication No. T103,703 and U.S. Pat. No. 4,396,755. In this process, reactants such as (a) an aromatic monocarboxylic acid, (b) a mixture of at least one aromatic dicarboxylic acid, and at least one aromatic compound capable of reacting with said dicarboxylic acid, and (c) combinations of (a) and (b) are reacted in the presence of a fluoroalkane sulphonic acid, particularly trifluoromethane sulphonic acid.

Additionally, poly(aryl ether ketone)s of the following formulae:

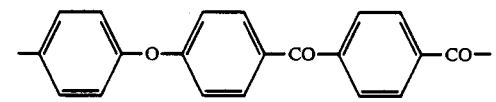

may also be prepared according to the process as described in, for example, U.S. Pat. No. 4,398,020. In such a process, (a) a mixture of substantially equimolar amounts of
(i) at least on aromatic diacyl halide of the formula

YOC—Ar₄—COY where —Ar₄— is a divalent aromatic radical, Y is halogen and COY is an aromatically bound acyl halide group, which diacyl halide is polymerizable with at least one aromatic compound of (a)(ii), and (ii) at least one aromatic compound of the formula

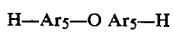
H—Ar₅—O Ar₅—H where —Ar₅— is a divalent aromatic radical and H is an aromatically bound hydrogen atom, which compound is polymerizable with at least one diacyl halide of (a)(i); or (b) at least one aromatic monoacyl halide of formula

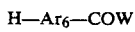
H—Ar₆—COW where —Ar₆— is a divalent aromatic radical and H is an aromatically bound hydrogen atom, Y is halogen, and COY is an aromatically bound acyl halide group, which monoacyl halide is self-polymerizable, and/or (c) a combination of (a) and (b) is polycondensed in the presence of a fluoroalkane sulphone acid.

The term poly(aryl ether ketone) as used herein is meant to include homopolymers, copolymers, terpolymers, block copolymers, graft copolymers, and the like. For example, any one or more of the repeating units (I) to (V) may be combined to form copolymers, etc.

The reduced viscosities of the useful poly(aryl ether ketones) should be in the same range as those of the PAEK co-carbonates.

The Poly(arylene sulfides)

The poly(arylene sulfides) are characterized in that they comprise repeating units of the structure

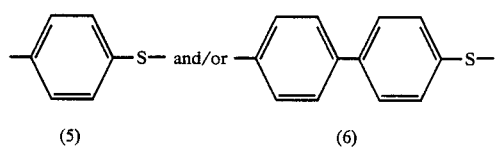

(5)  (6)

The materials may contain up to 30 mole percent, preferably less than 15 mole percent, and most preferably less than 2 mole percent of the following additional units:

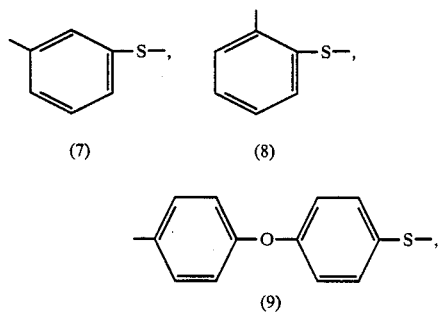

(7)  (8)

(9)

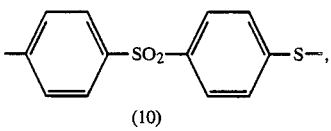

(10)

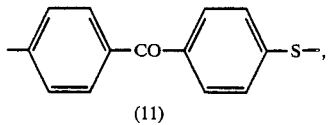

(11)

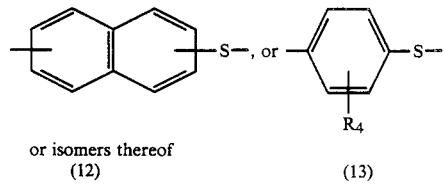

or isomers thereof
(12)  (13)

where R₄ is an alkyl, alkoxy or phenyl group.

The poly(arylene sulfide)s which are suitable for use herein are solid, have a melting point of at least about 150° F. and are insoluble in common solvents. Such resins can be conveniently prepared by the process disclosed in, for example, U.S. Pat. No. 3,354,129. Briefly, the process comprises the reaction of an alkali metal sulfide and a polyhalo ring-substituted aromatic compound in the presence of a suitable polar organic compound, as for example, the reaction of sodium sulfide with dichlorobenzene in the presence of N-methyl-2-pyrrolidone to form poly(phenylene sulfide).

The resulting polymer contains the aromatic nucleus of the polyhalo-substituted monomer coupled in repeating units predominantly through a sulfur atom. The polymers which are preferred for use according to this invention are those polymers having the repeating unit -R-S- where R is phenylene and/or biphenylene.

The preferred poly(arylene sulfide) is poly(phenylene sulfide), a crystalline polymer with a repeating structural unit comprising a para-substituted benzene ring and a sulfur atom which may be described by the following formula, where q has a value of at least about 50.

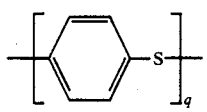

Suitable poly(phenylene sulfide) Compositions are available commercially under the tradename of RYTON of the Phillips Petroleum Company, and include compositions which are either unfilled or filled with fiberglass or some such conventional material. Preferably, the poly(phenylene sulfide) component has a melt flow index, measured at 600° F. using a 5 Kg weight and a standard orifice, within the range of from about 10 to about 7000.

The term poly(arylene sulfide) is meant to include not only homopolymers but also normally solid arylene sulfide copolymers, terpolymers and the like.

The Poly(ether imides)

The poly(ether imides) are of the formula (14):

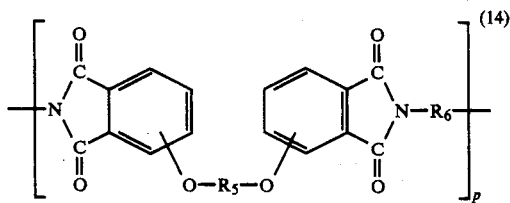
(14)

wherein p is an integer greater than 1, preferably from about 10 to about 10,000 or more; —O—R$_5$—O— is attached to the 3 or 4 and 3' or 4' positions and R$_5$ is selected from (a) a substituted or unsubstituted aromatic radical such as:

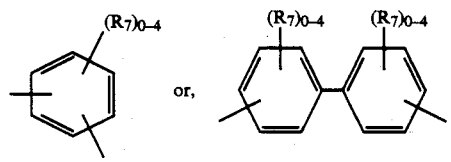

or, (b) a divalent radical of the formula:

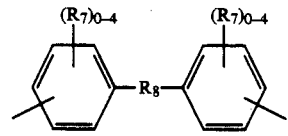

wherein R$_7$ is independently C$_1$ to C$_6$ alkyl, aryl or halogen and R$_8$ is selected from —O—, —S—,

—SO$_2$, —SO—, alkylene of 1 to 6 carbon atoms, cycloalkylene of 4 to 8 carbon atoms, alkylidene of 1 to 6 carbon atoms, or cycloalkylidene of 4 to 8 carbon atoms; R$_6$ is selected from an aromatic hydrocarbon radical having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms and C$_2$ to C$_8$ alkylene terminated polydiorganosiloxane or a divalent radical of the formulae:

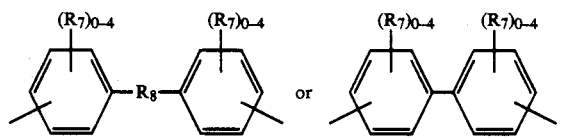

wherein R$_7$ and R$_8$ are as previously defined.

The poly(ether imides) may also be of the following formula:

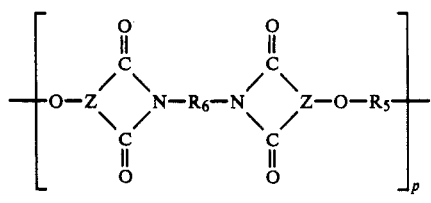
(15)

wherein —O—Z is a member selected from

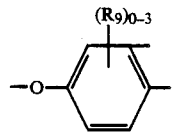

wherein R$_9$ is independently lower alkyl or lower alkoxy

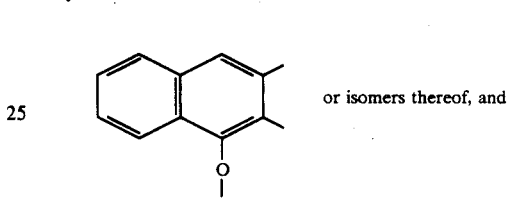

or isomers thereof, and

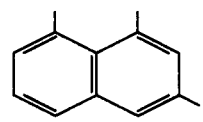

or isomers thereof wherein the oxygen atom may be attached to either ring and located ortho or para to one of the bonds of the imide carbonyl groups, and wherein R$_5$ and R$_6$ and p are as previously defined.

These poly(ether imides) are prepared by methods well known in the art as set forth in, for example, U.S. Pat. Nos. 3,833,544; 3,887,588; 4,017,511; 3,965,125; and 4,024,110.

The poly(ether imides) of formulae (14) and (15) can, for example, be obtained by any of the methods well known to those skilled in the art including the reaction of any aromatic bis-(ether anhydride) of the formula:

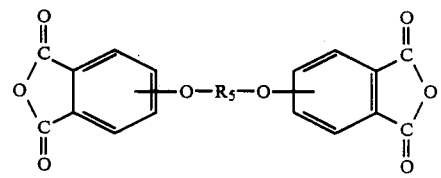
(16)

wherein R$_5$ is as defined hereinbefore, with a diamino compound of the formula wherein R$_6$ is as defined hereinbefore. In general, the reactions can be advantageously carried out employing well-known solvents, e.g., o-dichlorobenzene, m-cresol/toluene, N,N-dimethylacetamide, etc., in which the reactions between the dianhydrides and the diamines can be effected, at temperatures of from about 20° to about 250° C. Alternatively, the poly(ether imides) can be prepared by melt polymerization of any dianhydrides of formula (16) with any diamino compound of formula (17) while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily used in melt polymerizations can be employed. The conditions of the reaction and the proportions of ingredients can be varied widely depending on the desired molecular weight, intrinsic viscosity, and types of ingredients used. In general, equimolar amounts of diamine and dianhydride are employed for high molecular weight poly(ether imides); however, in certain instances, a slight molar excess (about 1 to 5 mole percent) of one of the reagents can be employed. Poly(ether imides) of formulae (14) or (15) having an intrinsic viscosity of greater than about 0.2 deciliters per gram, preferably about 0.35 to about 0.60, or about 0.7 deciliters per gram or even higher when measured in m-cresol at 25° C., at a concentration of 0.5 g/100 ml are the most useful.

The aromatic bis(ether anhydride)s of formula (16) include, for example:

2,2-bis[4-(2,3-dicarboxyphenoxy)phenyl]-propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone
4,4'-bis(2,3-dicarboxyphenoxy)diphenyl sulfone dianhydride;
2,2'-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
0 4,4'-bis(2,3-dicarboxyphenoxy)diphenyl dianhydride;
4,4'-bis(3,4-dicarboxyphenoxy)diphenyl dianhydride;
4,4' (2,3-dicarboxyphenoxy)-4,-(3,4-dicarboxyphenoxy) diphenyl; etc., and mixtures of such dianhydrides The organic diamines of formula (17) include, for example,
m-phenylenediamine, p-phenylenediamine,
2,2-bis(p-aminophenyl)propane,
4,4'-diaminodiphenyl-methane,
4,4'-diaminodiphenyl sulfide,
4,4'-diaminodiphenyl sulfone,
4,4'-diaminodiphenyl ether,
1,5-diaminonaphthalene,
3,3'-dimethylbenzidine, and
3,3'-dimethoxybenzidine; or mixtures of such diamines.

The poly(ether imides) of formulae (14) and (15) may also be prepared by effecting reaction in the presence of a dipolar aprotic solvent of a mixture of ingredients comprising, (a) a bis(nitrophthalimide) of the general formula:

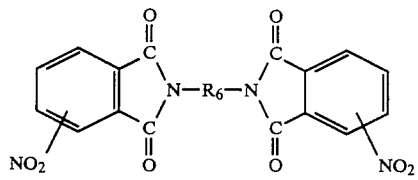
(18)

wherein $R_6$ is as hereinabove defined, and (b) an alkali metal salt of an organic compound of the general formula:

$$MO-R_5-OM \qquad (19)$$

wherein M is an alkali metal and $R_5$ is as hereinabove

The bis(nitrophthalimide) used in preparing the polymer is formed by reacting a diamine of the formula described above, $NH_2-R_6-NH_2$, with a nitro-substituted aromatic anhydride of the formula:

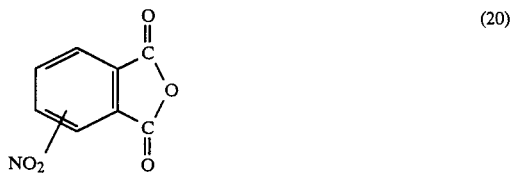
(20)

The molar ratio of diamine to anhydride should ideally be about 1:2 respectively. The initial reaction product is a bis(amide-acid) which is subsequently dehydrated to the corresponding bis(nitrophthalimide).

The diamines are described, supra.

The preferred nitrophthalic anhydrides useful in the present invention are 3-nitrophthalic anhydride, 4-nitrophthalic anhydride and mixtures thereof. These reactants are commercially available in reagent grade. They may also be prepared by the nitration of phthalic anhydride using procedures described in Organic Syntheses, Collective Vol. I, Wiley (1948), page 408. Certain other closely related nitroaromatic anhydrides may also be used in the reaction and are illustrated for example by 2-nitronaphthalic anhydride, 1-nitro-2,3-naphthalene-dicarboxylic anhydride and 3-methoxy-6-nitrophthalic anhydride, and the like.

With reference to the alkali metal salts of formula (19) among the divalent carbocyclic aromatic radicals which $R_5$ may represent (mixtures of such radicals are also included) of particular interest are, for instance, the divalent aromatic hydrocarbon radicals having from 6 to 20 carbon atoms, such as phenylene, biphenylene, naphthylene, etc. Included are residues of, e.g., hydroquinone, resorcinol, chlorohydroquinone, etc. In addition, $R_5$ may be a residue of a dihydroxyl diarylene compound in which the aryl nuclei are joined by either an aliphatic group, a cycloaliphatic group, a sulfoxide group, sulfonyl group, sulfur, carbonyl group, oxygen, a chemical bond, etc. Typical of such diarylene compounds are the following:
2,4-dihydroxydiphenylmethane,
bis(2-hydroxyphenyl)methane,
2,2-bis(4-hydroxyphenyl)propane,
bis(4-hydroxyphenyl)methane
bis(4-hydroxy-5-nitrophenyl)methane,
bis(4-hydroxy-2,6-dimethyl-3-methoxyphenyl) methane,
1,1-bis(4-hydroxphenyl)ethane, 1,2-bis(4-hydroxphenyl)ethane,
1,1-bis(4-chlorophenyl)ethane,
1,1-bis(2,5-dimethyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(4-hydroxynaphthyl)propane;
the naphthalene diols; and
bis(4-hydroxyphenyl)ether,
bis(4-hydroxyphenyl)sulfide,
bis(4-hydroxyphenyl)sulfone, and the like.

When dialkali metal salts of formula (19) are used with the compound illustrated by formula (18the) ingredients are advantageously present in an equal molar ratio for optimum molecular weight and properties of the polymer. However, slight molar excesses, e.g., about 0.001 to 0.10 molar excess of either the dinitro-substituted organic compound or of the dialkali metal salt of formula (19) may be employed. When the molar ratios are approximately equal, the polymer is substantially terminated by the end group $Z-NO_2$ at one end and by a phenolic group at the other end.

If there is a molar excess of one compound, that particular terminal group will predominate.

The conditions of reaction whereby the alkali-metal salt of formula (19) is reacted with the dinitro-substituted organic compound of formula (18) can be varied widely. Generally, temperatures of the order of about 25° to about 150° C. are advantageously employed, although it is possible to employ lower or higher temperature conditions depending on the ingredients used, the reaction product sought, time of reaction, solvent employed, etc. In addition to atmospheric pressure, superatmospheric pressures and subatmospheric pressures may be employed depending upon the other conditions of reaction, the ingredients used, the speed at which it is desired to effect reaction, etc.

The time of reaction also can be varied widely depending on the ingredients used, the temperature, the desired yield, etc. It has been found that times varying from about 5 minutes to as much as 30 to 40 hours are advantageously employed to obtain the maximum yield and desired molecular weight. Thereafter the reaction product can be treated in the appropriate manner required to effect precipitation and/or separation of the desired polymeric reaction product. Generally, common solvents such as alcohols (e.g., methanol, ethanol, isopropyl alcohol, etc.) and aliphatic hydrocarbons (e.g., pentane, hexane, octane, cyclohexane, etc.) may be employed as precipitants for this purpose.

It is important that the reaction between the dinitro-substituted organic compound of formula (18) and the alkali-metal salt of formula (19) (mixtures of such alkali-metal salts can also be used) be carried out in the presence of a dipolar aprotic solvent.

The polymerization is performed under anhydrous conditions usually using dipolar aprotic solvents such as dimethylsulfoxide which are added in varying amounts depending upon the particular polymerization. A total quantity of solvent, dipolar aprotic solvent or mixture of such solvent with an aromatic solvent sufficient to give a final solution containing 10 to 20 percent by weight of polymer is preferably employed.

The preferred poly(ether imides) include those having repeating units of the following formula:

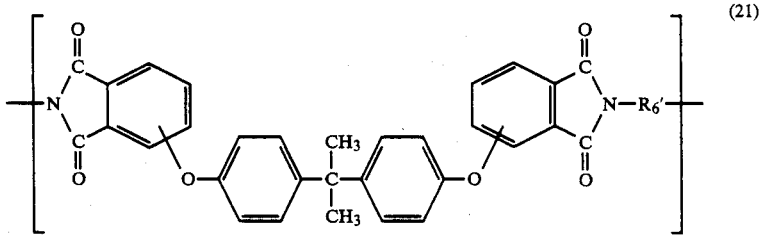

(21)

where $R'_6$ is one or more of

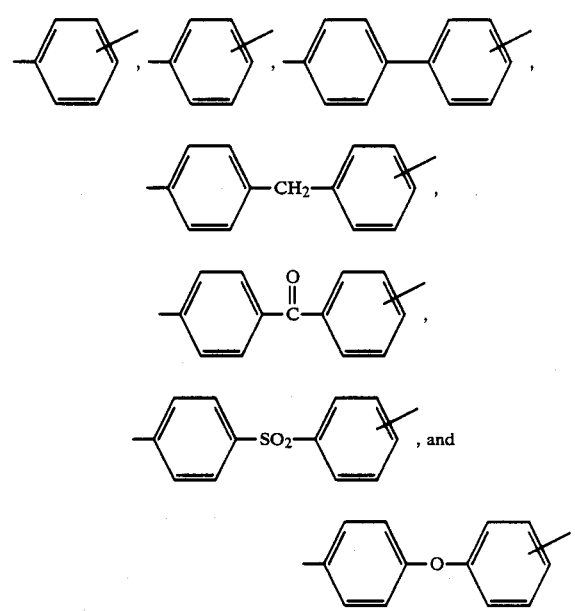

, and

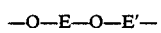

The poly(ether imide) where R, is meta-phenylene is most preferred.

The Poly(aryl ether's), PAE's

The aryl ether blocks of the instant invention are of the formula

—O—E—O—E'— wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms. Aromatic polyethers containing such units are described in, for example, U.S. Pat. Nos. 3,264,536 and 4,175,175. It is preferred that the dihydric phenol be a weakly acidic dinuclear phenol such as, for example, the dihydroxy diphenyl alkanes or the nuclear halogenated derivatives thereof, such as for example, the 2,2-bis(4-hydroxyphenyl)propane, 1,1- bis(4-hydroxyphenyl)2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as for example, ether oxygen (—O—), sulfone

or hydrocarbon residue in which the two phenolic nuclei are joined to the same or different carbon atoms of the residue.

Such dinuclear phenols can be characterized as having the structure:

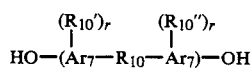

wherein $Ar_7$ is an aromatic group and preferably is a phenylene group, $R'_{10}$ and $R''_{10}$ can be the same or different inert substituent groups such as alkyl groups having from 1 to 4 carbon atoms, aryl, halogen atoms, i.e., fluorine, chlorine, bromine or iodine, or alkoxyl radicals having from 1 to 4 carbon atoms, the d's are independently integers having a value of from 0 to 4, inclusive, and $R_{10}$ is representative of a bond between aromatic carbon atoms as in dihydroxyl-diphenyl, or is a divalent radical, including for example, radicals such as —O—, —S—, —S—S——SO—, —SO$_2$, and divalent hydrocarbon radicals such as alkylene, alkylidene, cycloalkylene, cycloalkylidene, or the halogen, alkyl, aryl, or like substituted alkylene, alkylidene or cycloaliphatic radicals as well as aromatic radicals and radicals fused to both $Ar_7$ groups Examples of specific dihydric polynuclear phenols include among others:
the bis-(hydroxyaryl) alkanes such as
2,2-bis-(4-hydroxyphenyl)propane,
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane
2,2-bis-(2-isopropyl-4-hydroxyphenyl)propane
2,2-bis-(4-hydroxynaphthyl)propane
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane,
2,2-bis-(4-hydroxyphenyl)1,1,1, 3,3,3,-hexafluoropropane
and the like;
di(hydroxyaryl sulfones such as
bis-(4-hydroxyphenyl)sulfone,
2,4'-dihydroxydiphenyl sulfone,
5-chloro-2,4'-dihydroxydiphenyl sulfone,
5-chloro-4,4'-dihydroxydiphenyl sulfone, and the like;
di(hydroxyaryl)ethers such as
bis-(4-hydroxyphenyl)ether,
the 4,3'-, 4,2'-, 2,2'-, 2,3'-dihydroxyphenyl ethers,
4,4'-dihydroxy-2,6-dimethyldiphenyl ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether, and
4,4'-dihydroxy-3,6-dimethoxydiphenyl ether.
Other useful diphenols are, for example, the naphthalene diols, and the mononuclear diphenols such as hydroquinone or resorcinol. Dihydroxydiphenyls such as 4,4,-biphenol are also very useful.

As herein used, the E term is defined as being the "residuum of the dihydric phenol" of course refers to the residue of the dihydric phenol after the removal of the two aromatic hydroxyl groups. Thus, as is readily seen, these aryl ether units contain groups of the residuum of dihydric phenol and the residuum of the benzenoid compound bonded through aromatic ether oxygen atoms.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho or para to the halogen or nitro group. The dihalobenzenoid or dinitrobenzenoid compound can be either mononuclear, where the halogens or nitro groups are attached to the same benzenoid ring; or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about one percent and preferably below 0.5 percent for best results.

An electron withdrawing group is employed as the activator group in these compounds. It should be, of course, inert under the reaction conditions, but otherwise its structure is not critical. Preferred are the strongly activating groups such as the sulfone group

bonding two halogen or nitro substituted benzenoid nuclei, as in 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating groups can be basically either of two types:
(a) monovalent groups that activate one or more halogens or nitro groups on the same ring such as another nitro or halo group, phenylsulfone, or alkylsulfone, cyano, trifluoromethyl, nitroso, and hetero nitrogen, as in pyridine.
(b) divalent groups which can activate displacement of halogens on two different rings, such as the sulfone group

the vinylene group

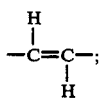

the sulfoxide group

the azo group

the saturated fluorocarbon groups

—CF$_2$CF$_2$CF$_2$—;
organic phosphine oxides

where R''' is a hydrocarbon group and the ethylidene group

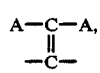

where A can be hydrogen or halogen.

If desired, the polymers may be made with mixtures of two or more dihalobenzenoid or dinitrobenzenoid compounds. Thus, the E' residuum of the benzenoid compounds in the polymer structure may be the same of different.

It is seen also that as used herein, the E' term defined as being the "residuum of the benzenoid compound" refers to the aromatic or benzenoid residue of the compound after the removal of the halogen atom or nitro group on the benzenoid nucleus.

Preferred aryl ether units of this invention are those prepared using the dihydric polynuclear phenols of the formulae (22)-(26) including the derivatives thereof which are substituted with inert substituent groups;

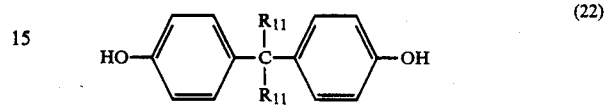

(22)

in which the R$_{11}$ groups represent independently hydrogen, lower alkyl, aryl and the halogen substituted derivatives thereof;

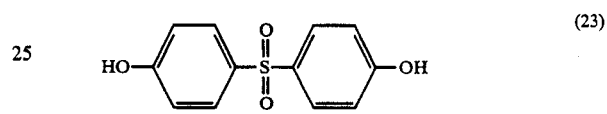

(23)

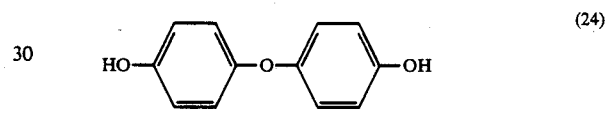

(24)

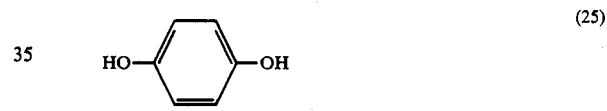

(25)

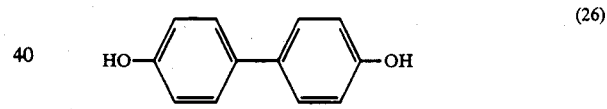

(26)

and substituted derivatives thereof.

it is also contemplated in this invention to use a mixture of two or more different dihydric phenols to accomplish the same ends as above. Thus, when referred to above, the —E—residuum in the polymer structure can actually by the same or different aromatic residua.

The preferred dihalobenzenoid compounds are (27), (28), (29), and (30); they may carry inert substituent groups.

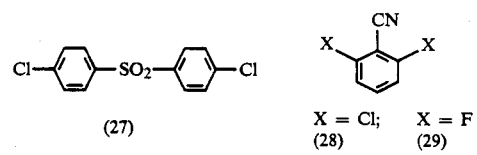

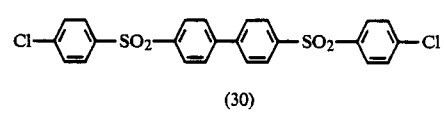

(30)

The preferred aryl ether blocks are those containing sulfone groups. Most preferred blocks are of the formulae (3), (4), (31), and (32).

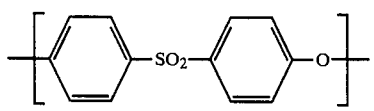 (3)

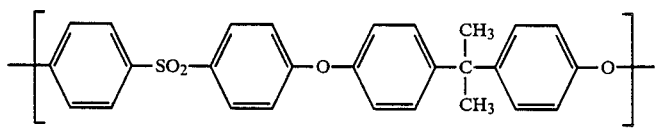 (4)

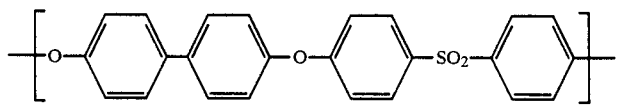 (31)

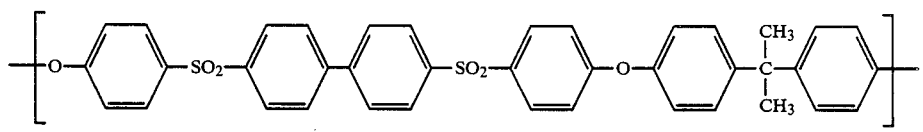 (32)

The poly(aryl ether sulfones) may be prepared by either of two methods, i.e., the carbonate method or the alkali metal hydroxide method.

In the carbonate method, the polymers are prepared by contacting substantially equimolar amounts of the hydroxy-containing compounds and dihalodiarylsulfones, e.g., 4,4'-dichlorodiphenyl sulfone or 4,4'-difluorodiphenyl sulfone, with from about 0.5 to about 1.0 mole of an alkali metal carbonate per mole of hydroxyl group in a solvent mixture comprising a solvent which forms an azeotrope with water in order to maintain the reaction medium at substantially anhydrous conditions during the polymerization.

The temperature of the reaction mixture is kept at about 170° C. to about 250° C., preferably from about 210° C. to about 235° C. for about one to about 15 hours.

In a modification which is particularly suitable for making copolymers from bisphenol A and one or more additional dihydroxy compounds, the reactants other than said additional dihydroxy compounds are charged and heated at from about 120° C. to about 180° C. for about one to about 5 hours, said additional dihydroxy compounds are added, the temperature is raised and the mixture is heated at from about 200° C. to about 250° C., preferably from about 210° C. to about 240° C., for about one to about 10 hours. This modification is further described in the U.S. Pat. No. 4,783,520 of Donald R. Kelsey, et al., issued Nov. 8, 1988, commonly assigned.

The reaction is carried out in an inert atmosphere, e.g., nitrogen, at atmospheric pressure, although higher or lower pressures may also be used.

The poly(aryl ether sulfone) is then recovered by conventional techniques such as coagulation, solvent evaporation, and the like.

The solvent mixture comprises a solvent which forms an azeotrope with water and a polar aprotic solvent. The solvent which forms an azeotrope with water includes an aromatic hydrocarbon such as benzene, toluene, xylene, ethylbenzene, chlorobenzene, and the like.

The polar aprotic solvents employed in this invention are those generally known in the art for the manufacture of poly(aryl ether sulfones) and include sulfur containing solvents such as those of the formula:

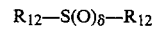

in which each $R_{12}$ represents a monovalent lower hydrocarbon group free of aliphatic unsaturation, which preferably contains less than about 8 carbon atoms or when connected together represents a divalent alkylene group with $\delta$ being an integer from 1 to 2 inclusive. Thus, in all of these solvents, all oxygens and two carbon atoms are bonded to the sulfur atom. Contemplated for use in this invention are such solvents as those having the formula:

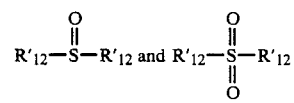

where the $R'_{12}$ groups are independently lower alkyl, such as methyl, ethyl, propyl, butyl, and like groups, and aryl groups such as phenyl and alkylphenyl groups such as the tolyl group, as well as those where the $R'_{12}$ interconnected as in a divalent alkylene bridge such as

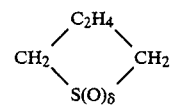

in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide.

Additionally, nitrogen containing solvents may be used. These include dimethylacetamide, dimethylformamide and N-methylpyrrolidone.

The azeotrope forming solvent and polar aprotic solvent are used in a weight ratio of from about 1:10 to about 1:1, preferably from about 1:5 to about 1:3.

In the reaction, the hydroxy containing compound is slowly converted, in situ, to the alkali salt thereof by reacting with the alkali metal carbonate. The alkali metal carbonate is preferably potassium carbonate. As indicated before, mixtures of carbonates such as potassium and sodium carbonate may also be used.

Water is continuously removed from the reaction mass as an azeotrope with the azeotrope forming solvent so that substantially anhydrous conditions are maintained during the polymerization.

It is essential that the reaction medium be maintained substantially anhydrous during the polycondensation. While amounts of water up to about one percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only low molecular weight products are secured. Consequently, in order to secure the high polymers, the system should be substantially anhydrous, and preferably contain less that 0.5 percent by weight water during the reaction.

While the carbonate method for preparing the polymers of this invention is simple and convenient, in some cases products of higher molecular weight can be made by the alkali metal hydroxide method. In the alkali metal hydroxide method, described by Johnson et al., U.S. Pat. Nos. 4,108,837 and 4,175,175, a double alkali metal salt of a dihydric phenol is contacted with a dihalobenzenoid compound in the presence of a sulfur containing solvent as herein above defined under substantially anhydrous conditions.

Additionally, the polymers of this invention may be prepared by other methods known in the prior art, in which at least one dihydric phenol and at least one dihalobenzenoid compound are heated, for example, with a mixture of sodium carbonate or bicarbonate and a second alkali metal carbonate or bicarbonate having a higher atomic number than that of sodium, as described in U.S. Pat. No. 4,176,222.

The poly(arylethers) have a reduced viscosity of from about 0.35 to about 1.5 dl/g as measured in an appropriate solvent at an appropriate temperature depending on the particular polyether. Typical solvents are, for example, methylene chloride or chloroform in which the RV's are generally measured at 25° C.

Preparation of the Blends; Foam Products

In preparing the blends of the present invention, the individual components are commonly provided in the form of chips, pellets or powders. Each of the components is weighed separately, and the components are physically mixed together in any appropriate apparatus, e.g., a ball mill. The physical mixture is then dried, preferably under vacuum or in a circulating air oven, although any other suitable apparatus may be used. The purpose of the drying step is to remove water from the physical mixture so as to prevent degradation. After the mixture of the solid polymer particles (which, optionally, may also contain reinforcing filler, fiber, and the like—vide infra) has been dried, the blend can be prepared. A convenient method of forming the blend is melt extrusion. The extrusion apparatus thoroughly mixes the polymers in the melt and then extrudes the blend in the form of a strand which, upon solidification, can be broken up into chips or pellets.

It is, of course, also possible to prepare the subject blends "in-situ", i.e. by mixing the bis(arylcarbonate) precursor of the poly(aryl ether ketone co-carbonate) with the PAEK, PPS, the poly(ether imide) or the poly(aryl ether); adding the base catalyst and heating the mixture to form the ketone-ether-carbonate copolymer. Since the latter reaction is accompanied by carbon dioxide evolution, it is possible to make use of it for the preparation of foamed products.

Thus, an additional embodiment of the instant invention is a process for the preparation of high quality foam products from high performance engineering polymers. The process can be used for the preparation of foamed articles from homopolymer poly(aryl ether ketones), poly(arylene sulfides), poly(ether imides), and poly(aryl ethers); or from their alloys with poly(aryl ether ketone co-carbonates). These latter foams are novel compositions of matter.

The process conditions whereby the above foam products can be prepared are the same for both the homopolymer and the alloy cases. Briefly, the bis(aryl carbonate) [precursor of the poly(aryl ether ketone co-carbonate)]is blended with one of the homopolymers listed above. A base catalyst is admixed in amounts of from about 0.1 to about 5.0, preferably from about 0.5 to about 3.0 weight percent, based on the bis(aryl carbonate) precursor. The mixture is then heated at about 250° to about 410° C., preferably, at about 280° to about 390° C., for periods of about 5 minutes or longer, depending on the particular case, and on the temperature employed. Useful catalysts are the same as those described for the preparation of the poly(aryl ether ketone co-carbonates). Where homopolymer foams are prepared, the bis(aryl carbonate) precursor is used in amounts of from about 0.1 to about 10, preferably in amounts of from about 2 to about 7 weight percent, based on the homopolymer.

The instant process for the preparation of foamed polymers has several unexpected advantages. Thus, the quality and uniformity of the foams are excellent. The decomposition of the bis(aryl carbonate) "foaming agent" takes place at elevated temperatures, allowing for several process operations prior to foaming. And, most importantly, the residual product left after the evolution of carbon dioxide is a high temperature resistant, tough poly(aryl ether ketone co-carbonate) which has no deleterious effect on the thermal stability of the foam. Note, that the bis(aryl carbonates) of formula (33)

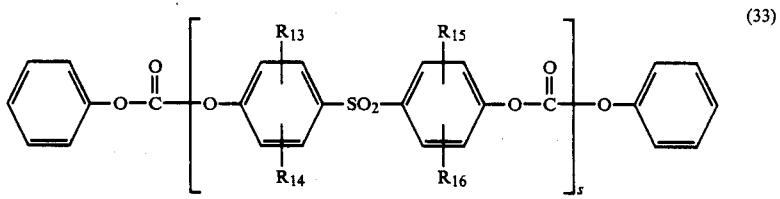

(33)

where s is 2 to 10; $R_{13}$, $R_{14}$, $R_{15}$ and $R_{16}$ are independently hydrogen, halogen, $C_1$ to $C_{10}$ alkyl, or phenyl; have been disclosed as foaming agents for polyphenylene sulfide; see European Patent Application EP No. 251,108. The reaction, however, leaves residual poly(aryl ether sulfone) having only limited high temperature stability.

The novel alloys of this invention may include mineral fillers such as carbonates including chalk, calcite and dolomite; silicates including mica, talc, wollastonite, silicon dioxide; glass spheres, glass powders; aluminum, clay, quartz, and the like. Also, reinforcing fibers such as fiberglass, carbon fibers, and the like may be used.

The alloys may also include additives such as titanium dioxide, thermal stabilizers, ultraviolet light stabilizers, plasticizers, and the like.

The blends of this invention may be fabricated into any desired shape, i.e. moldings, coatings, films, or fibers.

EXAMPLES

The following examples serve to give specific illustrations of the practice of this invention but they are not intended in any way to limit the scope of this invention.

Preparative Example

A 250 milliliter three-neck round bottom flask was equipped with a mechanical stirrer, a nitrogen purging unit, thermocouple and a distilling column (2.5 cm × 16.5 cm, filled ⅓ full with ¼" glass spheres). The distilling column was wrapped with heating tape beginning 3.5 cm from the 24/40 joint and extending to a distance 3 5 cm from the top of the distilling column. The distilling column was fitted with a one piece condensing unit with thermometer. The condenser was also wrapped with heating tape.

The flask was charged with 32.5 grams (151 mmoles) of 4,4'-dihydroxybenzophenone recrystallized three times from ethanol/water (50/50 w/w), 33.0 grams (157 mmoles) of distilled diphenyl carbonate, 96.0 grams of diphenyl sulfone, 20.0 grams of diphenyl ether, and 20.0 grams of m-xylene.

Then, 0.68 grams (5 mmoles) of finely ground potassium carbonate were added and the reactor contents were purged with nitrogen for one hour.

The reaction mass was heated to 180° C. for 45 minutes. The distilling column zone was heated to 160° C. The xylene/$H_2O$ azeotrope was taken overhead and collected in the first receiver.

The reaction mass temperature was raised to 285° C. for 2.5 hours. The distilling column zone temperature was raised to 260° C. to allow for removal of phenol by-product. The reaction mass temperature was raised to 290° C. for 1.5 hours and then to 325° C. for two hours. Throughout the temperature step profile, the viscosity was increasing (visual observation). At the end of the temperature cycle, 2.3 grams of 1,4'-bis(-fluorobenzoyl) benzene were added to endcap any free phenate end groups.

The polymer work-up included:

(1) initial acetone (reflux) extraction of the polymer pieces, (2) pulverization of the polymer, and (3) two successive acetone (reflux) and water (60.C) extractions, each for a period of seven hours (10:1 by weight; solvent/polymer).

The polymer was obtained in a quantitative yield and its reduced viscosity (1.0 g/100 ml; conc. $H_2SO_4$, 25° C.) was 1.79 dl/g. The properties are listed in Table I. NMR $C^{13}$ studies indicated that the material was a poly(ether ketone carbonate) of the formula (34):

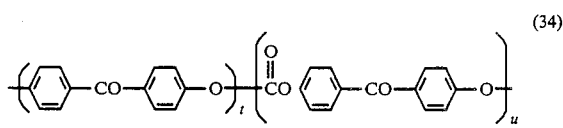

where $t/(t+u)$ was in the range of about 0.75–0.85.

TABLE I

| Properties of the Polymer Made in the Preparative Example | |
|---|---|
| Property | |
| Tg (°C.; DSC) | 148 |
| Tm (°C.) | 334 |
| ΔH (cal./g) | 9.24 |
| RV (dl/g; conc.$H_2SO_4$,25° C.) | 1.79 |
| Tensile strength (psi) | 12,900 |
| Yield strength (psi) | 12,900 |
| Tensile Modulus (psi) | 338,000 |
| Elongation (%) | |
| Yield | 7 |
| Break | 12–28 |
| Pendulum Impact | |
| (ft. lbs/in³) | 87 |
| MF$_{10}$ (400° C., IOP) | 11.54 |
| MF$_{30}$/MF$_{10}$ | 1.01 |

EXAMPLES 1–14

The blends listed in table II are prepared using the poly(aryl ether ketone co-carbonate) above. All of the alloys show a good combination of mechanical and thermal properties.

TABLE II

Blends of the Poly(aryl ether ketone co-carbonate) of the Preparative Example With Other Polymers

| Ex. No. | Polymer | Wt. Ratio of Polymer:Poly(aryl ether ketone co-carbonate) | Remarks |
|---|---|---|---|
| 1. | –O–C₆H₄–CO–C₆H₄– | 80:20 | Excellent high temperature stability. Improved melt-fabricability. |
| 2. | –O–C₆H₄–CO–C₆H₄– | 60:40 | Excellent high temperature stability. Improved melt-fabricability. |
| 3. | –O–C₆H₄–O–C₆H₄–CO–C₆H₄– | 50:50 | Excellent high temperature stability. Improved melt-fabricability. |
| 4. | –O–C₆H₄–O–C₆H₄–CO–C₆H₄– | 40:60 | Excellent high temperature stability. Improved melt-fabricability. |
| 5. | –S–C₆H₄– | 30:70 | Easy to melt-fabricate. Tough, good abrasion resistance. |
| 6. | –S–C₆H₄– | 50:50 | Easy to melt-fabricate. Tough, good abrasion resistance. |
| 7. | –S–C₆H₄– | 60:40 | Easy to melt-fabricate. Tough, good abrasion resistance. |
| 8. | –S–C₆H₄– | 75:25 | Easy to melt-fabricate. Tough, good abrasion resistance. |

TABLE II-continued

Blends of the Poly(aryl ether ketone co-carbonate) of the Preparative Example With Other Polymers

| Ex. No. | Polymer | Wt. Ratio of Polymer:Poly(aryl ether ketone co-carbonate) | Remarks |
|---|---|---|---|
| 9. | (structure: bis-phthalimide with isopropylidene-diphenyl ether and methyl substituents) | 40:60 | Improved high temperature and solvent resistance. |
| 10. | (structure: bis-phthalimide with isopropylidene-diphenyl ether and methyl substituents) | 50:50 | Improved high temperature and solvent resistance. |
| 11. | (structure: bis-phthalimide with isopropylidene-diphenyl ether and methyl substituents) | 60:40 | Improved high temperature and solvent resistance. |
| 12. | (structure: sulfone-ether-isopropylidene aromatic polymer with methyl substituent) | 50:50 | Improved solvent resistance. |
| 13. | (structure: sulfone-ether-isopropylidene aromatic polymer with methyl substituent) | 60:40 | Improved solvent resistance. |
| 14. | (structure: bis(4-methoxyphenyl) sulfone with methyl substituent) | 50:50 | Improved solvent resistance. |

EXAMPLE 15

Five grams of the bis(phenyl carbonate) (35)

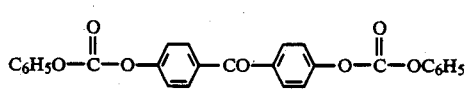
(35)

are mixed with 100 gms of the poly(aryl ether ketone) of formula (2) and with 0.15 gms of sodium phenoxide. A foamed product is obtained by heating the above mixture at about 360° C.

Foams based on polyphenylene sulfide, poly(ether imides) and poly(aryl ethers) are prepared using similar methods.

What is claimed is:

1. Blends comprising from about 1 to about 99 percent by weight poly(aryl ether ketone co-carbonate) and from about 99 to about 1 percent by weight of at least one thermoplastic polymer selected from the groups consisting of a poly(aryl ether ketone), a poly(arylene sulfide), a poly(ether imide) and a poly(aryl ether).

2. Blends as defined in claim 1 wherein the poly(aryl ether ketone co-carbonates) contain the units

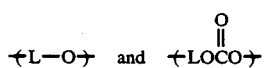

wherein $+L-O+$ is one or more of the following:

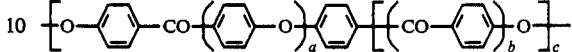

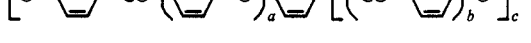

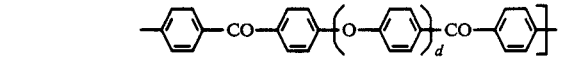

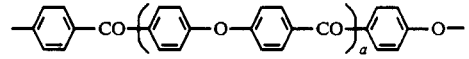

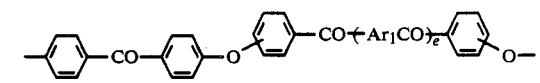

where $Ar_1$ and $Ar_2$ are independently divalent aromatic radicals selected from phenylene, biphenylene, or naphthylene, and a is an integer of from 1 to 4; b, c, d, and e are 0 to 1; and wherein the content of the carbonate units is from about 5 to about 50 mole percent based on the total number of moles of ether and carbonate units.

3. Blends as defined in claim 2 where the $+L-O+$ units are of the formulae:

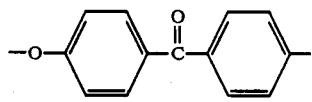

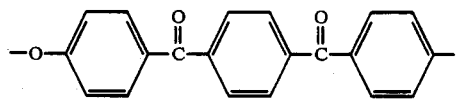

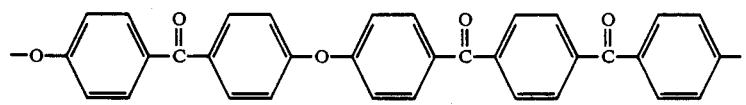

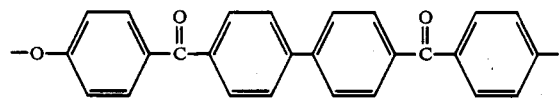

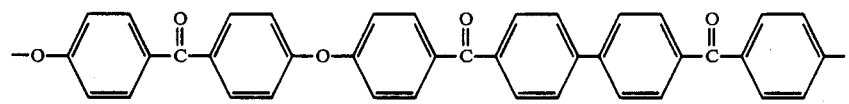

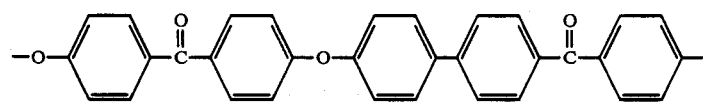

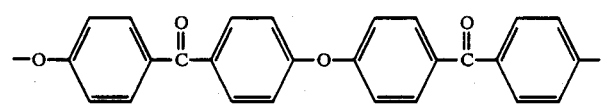

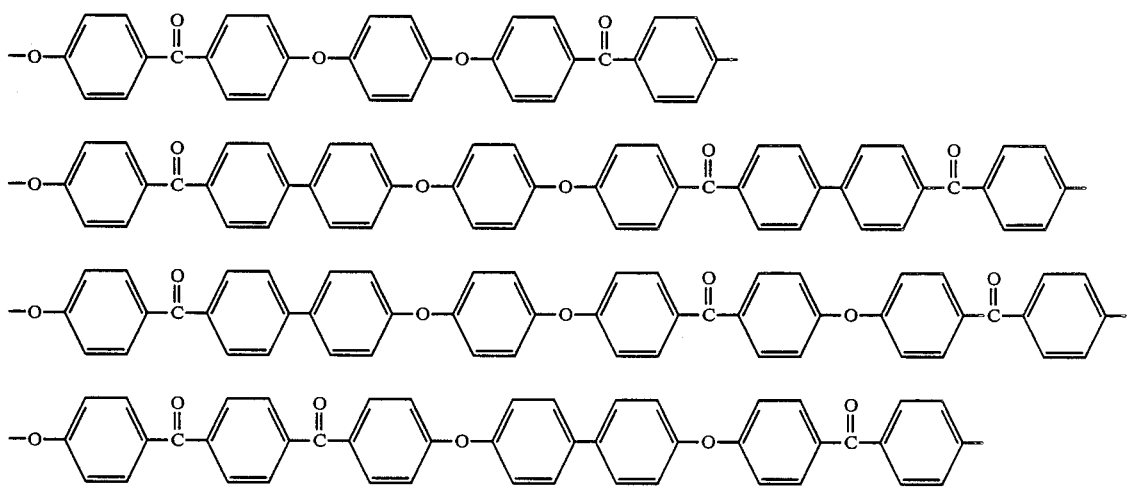

and

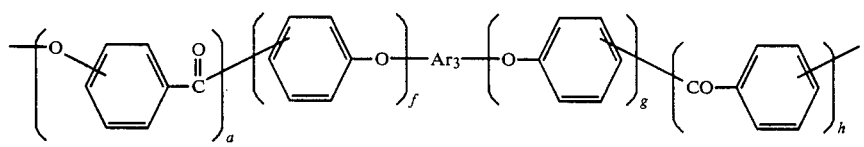

where a is as previously defined; f and g are integers and can be independently from 0 to 5; h is 1 to 4; and Ar₃ is selected from the group of

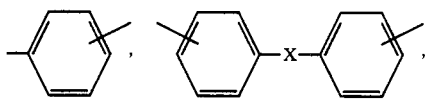

where X is o, S, $C_1$ to $C_{10}$ alkylene, $C_2$ to $C_{10}$ alkylidene, $C_6$ to $C_{12}$ cycloalkylene or cycloalkylidene, CO, $C_6$ to $C_{20}$ arylene, a $C_6$ to $C_{20}$ heterocyclic divalent residue, or a chemical bond;

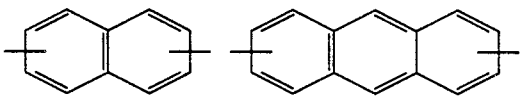

or isomers thereof;     or isomers thereof;

and

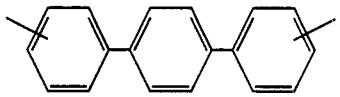

or isomers thereof.

4. Blends as defined in claim 1 wherein the poly(aryl ether ketone) contains repeating units of one or more of the following formulae:

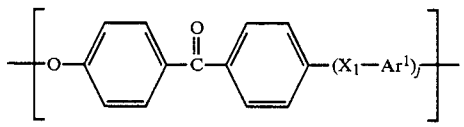

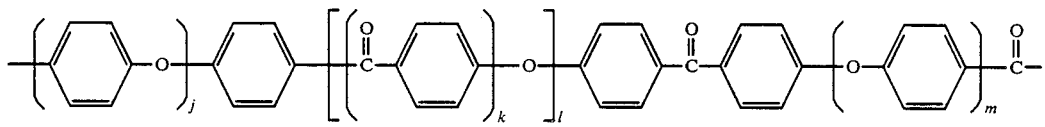

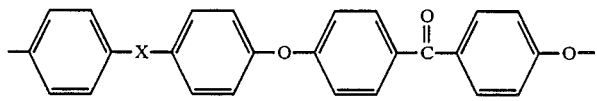

-continued
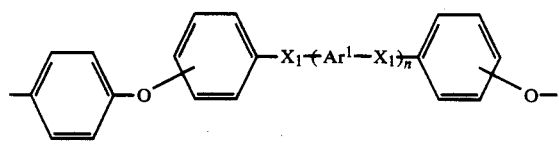
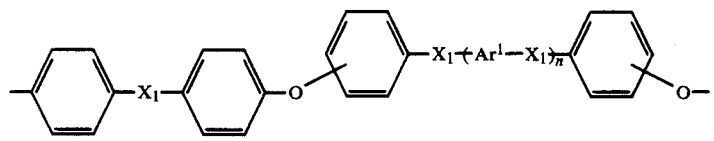
wherein Ar¹ is independently a divalent aromatic radical selected from phenylene, biphenylene or naphthylene, $X_1$ is independently O, C=O, or a direct bond and i is an integer of from 0 to 3; k, l, m, and n are 0 or 1; and j is an integer of 1 to 4.
5. Blends as defined in claim 4 wherein the poly(aryl ether ketone) contains repeating units of the formulae:
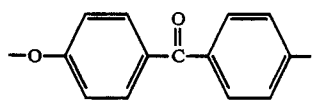
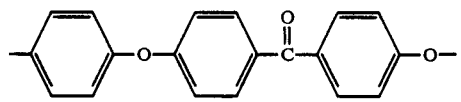
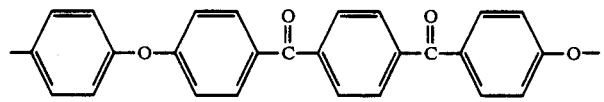
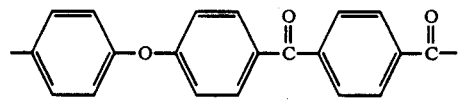
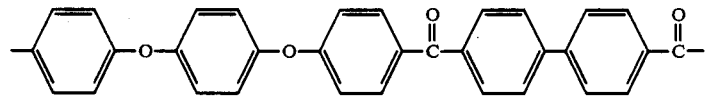
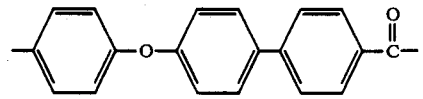
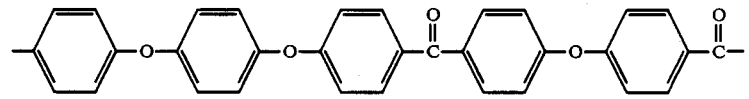
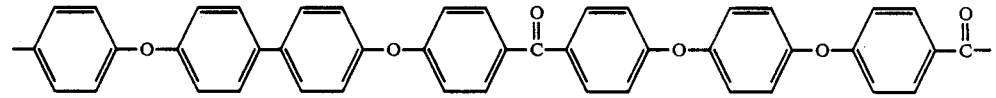
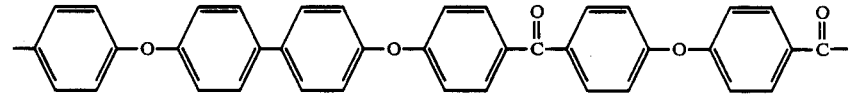
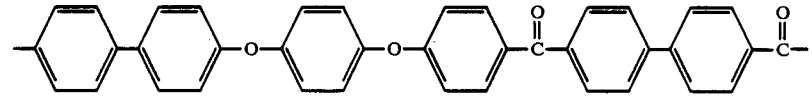

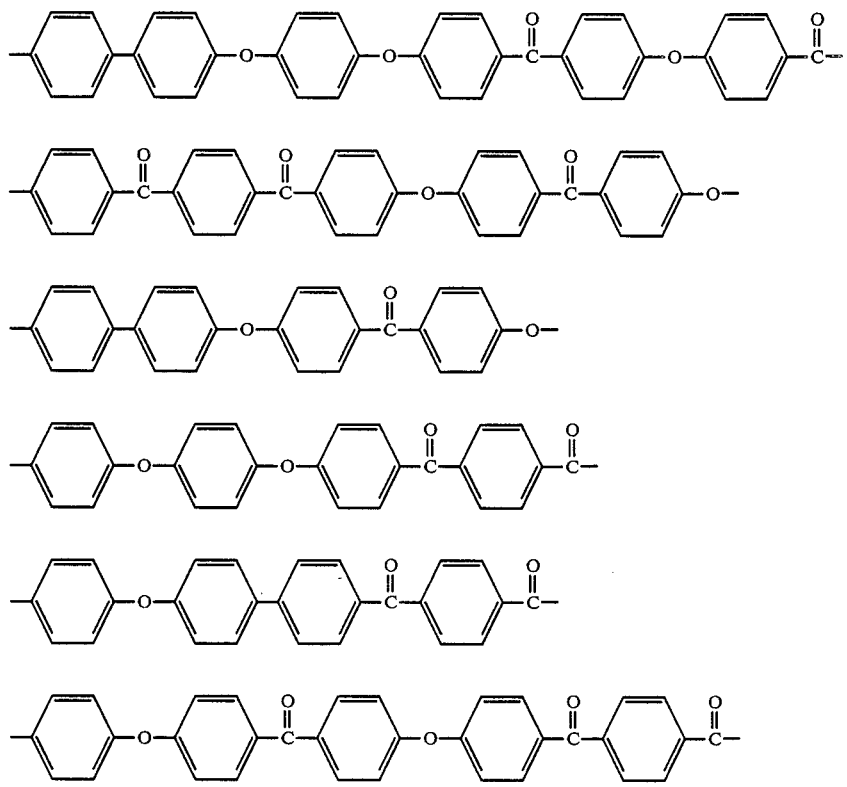

6. Blends as defined in claim 1 wherein the poly(arylene sulfide) comprise at least one repeating unit selected from the group consisting of the structure

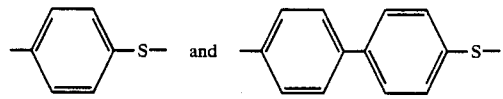

and up to 30 mole percent of the following additional units selected from the group consisting of

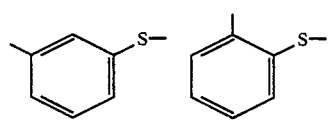

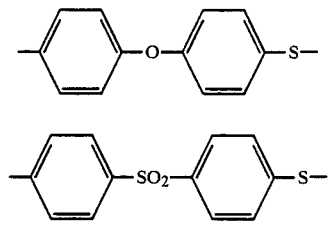

-continued

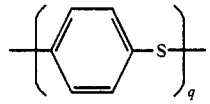

or isomers thereof, where
R$_4$ is then selected from the group consisting of an alkyl, alkoxy and phenyl group.

7. Blends as defined in claim 6 wherein the poly(arylene sulfide) is poly(p-phenylene sulfide) of the formula $$\left\{\!\!\left\langle\bigcirc\right\rangle\!\!-\!\!S\right\}_{q}$$

where q is at least about 50.

8. Blends as defined in claim 1 wherein the poly(ether imide) is of the formula

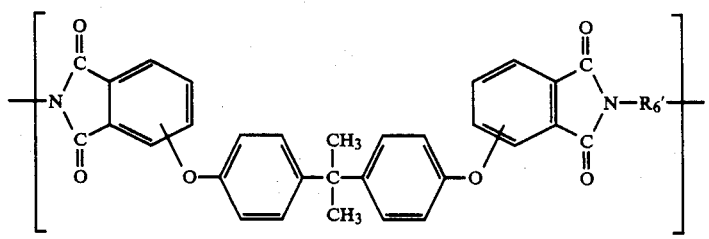

where R'₆ is one more of

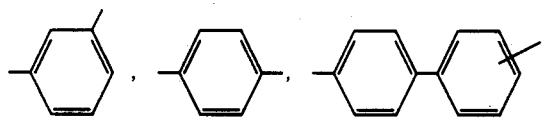

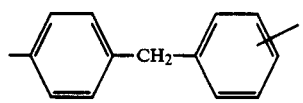

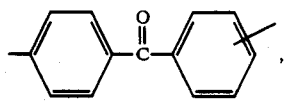

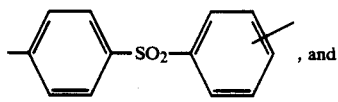, and

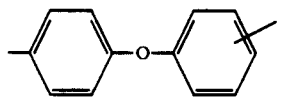

9. Blends as defined in claim 1 wherein the poly(aryl ether) is of the formula

wherein E is the residue of a dihydric phenol, and E, is the residuum of a benzenoid compound having an inert electron withdrawing group in at least one of the positions ortho and para to the valence bonds; both of said residua being valently bonded to the ether oxygens through aromatic carbon atoms.

10. Blends as defined in claim 9 wherein E is the residuum of one or more of the following dihydric phenols;

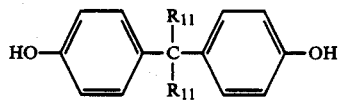

in which the $R_{11}$ groups represent independently hydrogen, lower alkyl, aryl and the halogen substituted derivatives thereof;

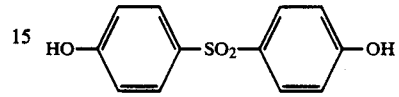

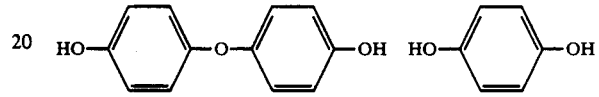

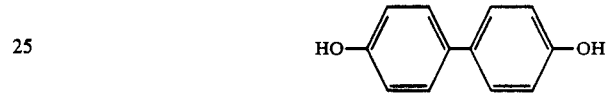

and substituted derivatives thereof.

11. Blends as defined in claim 9 wherein E, is the residuum of one or more of the following dihalobenzenoid compounds:

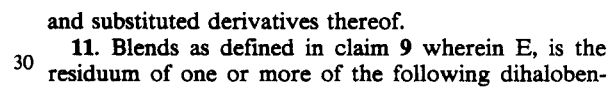

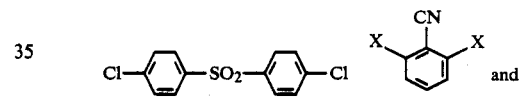

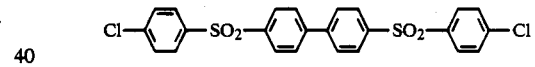

where X is chlorine or fluorine.

12. Compositions comprising the blends of claim 1 and reinforcing agents selected from one or more of chalk, calcite, dolomite, mica, talc, wollastonite, silicon dioxide, glass spheres, glass powders, aluminum, clay, quartz, fiberglass and carbon fibers.

13. Process for preparing a blend which comprises mixing a foaming agent bis(arylcarbonate) which is a precursor of poly(aryl ether ketone co-carbonate), with poly(aryl ether ketone), poly(arylene sulfide), poly(ether imide) or poly(aryl ether); adding a base catalyst and heating the mixture to form blend.

14. Process as defined in claim 13 wherein the bis(aryl carbonate), precursor of the poly(aryl ether ketone co-carbonate), is used in amounts of from about 0.to about 10 weight percent based on the weight of the poly(aryl ether ketone), the poly(arylene sulfide), the poly(ether imide) or the poly(aryl ether); and where said process yields high quality foamed articles from said poly(aryl ether ketone), poly(arylene sulfide), poly(ether imide) or poly(aryl ether).

15. Foamed articles prepared from poly(aryl ether ketones), poly(arylene sulfides), poly(ether imides) and poly(aryl ethers) using the process defined in claim 14.

* * * * *

UNITED STATES PATENT AND TRADEMARK OFFICE
CERTIFICATE OF CORRECTION

PATENT NO. : 4,975,470
DATED : December 4, 1990
INVENTOR(S) : Markus Matzner, et al.

It is certified that error appears in the above-identified patent and that said Letters Patent is hereby corrected as shown below:

| Col. | Line | |
|------|------|---|
| 2 | 17 | "– 15°F." should read --- 150°F--. |
| 8 | 19 | "R'," should read --R'$_3$,--. |
| 18 | 58 | "the formula" should read --the formula H$_2$N-R$_6$-NH$_2$ (17). |
| 19 | 33 | "benzophenone" should read --benzophenone dianhydride--. |
| 21 | 2 | "(4-chlorophenyl)ethane," should read --(4-hydroxy-2-chlorophenyl)ethane,--. |
| 22 | 48 | "R," should read --R'$_6$--. |
| 25 | 35-42 | "the azo group $-\overset{\overset{\displaystyle O}{\|}}{\underset{\underset{\displaystyle R'''}{\|}}{P}}-$ " should read --the azo group –N=N–;--. |
| 31 | 31 | "3 5 cm" should read --3.5 cm--. |
| 46 | 56 | "0.to" should read --0.1 to--. |

Signed and Sealed this

Fifteenth Day of September, 1992

Attest:

DOUGLAS B. COMER

Attesting Officer     Acting Commissioner of Patents and Trademarks